United States Patent Office 3,472,918
Patented Oct. 14, 1969

3,472,918
LINEAR BLOCK COPOLYMERS PRODUCED BY PHOTOCHEMICAL POLYMERIZATION
James Edwin Guillet, Don Mills, Ontario, Canada, assignor to Eastman Kodak Company, a corporation of New Jersey
No Drawing. Filed Mar. 4, 1965, Ser. No. 437,271
Int. Cl. C08f *19/02, 15/16*
U.S. Cl. 260—878                    15 Claims

ABSTRACT OF THE DISCLOSURE

Linear block copolymers prepared by subjecting ethylene-carbon monoxide polymers and a vinyl monomer to the action of ultraviolet light.

---

This invention relates to novel polymeric compositions possessing an unusual combination of chemical, physical and mechanical properties and to methods of preparing such compositions. More particularly, the invention relates to the production of linear block copolymers by the photochemical action of ultraviolet light on ethylene-carbon monoxide polymers in the presence of vinyl monomers typified by such compounds as styrene, acrylonitrile, vinyl acetate, methyl methacrylate and methyl acrylate.

When two or more monomers are copolymerized, the monomer units may be arranged in a number of different ways and the properties of the polymer will depend to a very large extent on the sequential arrangement of the monomer units. For example, if one monomer type is denoted by A and another by B, three general types of arrangements can be distinguished, namely, AABBBABAABBBAABABBAAAAB-[random copolymer]

```
                       B
                       B
                       B
                       B
AAAAAAAAAAAAAAAAAAAAAAAAAA-[graft copolymer]
     B                 B
     B                 B
     B                 B
     B                 B
     B
     B
     B
```

AAAAAAAAAAAAAAAAAABBBBBBBBBBBBBB  (I)
[linear block copolymer]

BBBBBBBBAAAAAAAAAAAABBBBBBBBB  (II)

As is well known, random copolymers can be readily prepared from most monomers by simply mixing the components and polymerizing in the presence of a suitable catalyst which may be of either a free radical or ionic type. The preparation of such copolymers is fully described by George E. Ham in his text, Copolymerization, Interscience Publishers, (1964).

As is also well known, graft copolymers can be prepared in a number of ways, the most common of which is to polymerize one monomer (B) in the presence of a preformed polymer (A). The growing radicals abstract hydrogens from the preformed polymer, forming new polymeric radicals which initiate further polymerization. By this process a poly (B) chain is attached laterally to the poly (A) backbone as in the diagram above. Examples of this type of process have been described by Coover and Dickey in U.S. Patent 2,763,631, by Miller in U.S. Patent 2,873,240 and by F. M. Merrett, Trans. Faraday Soc. 50 759 (1954).

Block copolymers are, in general, much more difficult to synthesize. Topologically they can be distinguished from graft copolymers by the fact that they have the same number of ends as the original "backbone" polymer, whereas a graft copolymer will have one additional end for each graft sequence. Thus, in the example shown above a linear A sequence with 3 B sequence grafted to it has a total of 2+3=5 ends. A linear A sequence can be formed into a block copolymer with either one or two B sequences, but the polymer molecule is still linear and has only two ends [Examples I and II]. If the "backbone" A sequence is itself branched, a block copolymer made from it will also be branched to the same degree, as in Example III below:

```
BBBBBBAAAAAAAAAAAAAAAAAABBBBBBB
            A
            A
            A
            B
            B
            B
            B
            B                          (III)
```

In this case the original A sequence has one branch and therefore 2+1=3 ends. The block copolymer also has 3 ends. Thus the blocking is linear to the chains already formed. Therefore, by the term "linear block copolymer" as used herein and in the appended claims is meant a polymer in which the blocking does not produce any more ends than were present in the original prepolymer.

The distinct monomer sequences in a block copolymer are designated "periods." Example I has two periods and is known as a two-period block copolymer. Examples II and III have three and four periods respectively. The number of periods is numerically equal to one pulse the number of A—B (or B—A) bonds.

Methods of synthesizing linear block copolymers are relatively rare, particularly methods for the synthesis of addition polymers. The most important is the "living polymer" method developed by Szwarc [Makromol. Chem. 35 132 (1960)]. However, this method is applicable to the production of linear block copolymers from a very limited range of monomers such, for example, as the copolymers of styrene and ethylene oxide and of styrene and methyl methacrylate.

A photochemical method of producing block copolymers was developed by Otsu [J. Pol. Sci., 26 236 (1957)] which involved irradiating polystyrene containing end groups of the structure $$\begin{array}{c}R\\ \diagdown \\ \phantom{xx}N-\overset{\overset{\displaystyle S}{\|}}{C}-S-\\ \diagup \\ R\end{array}$$

in the presence of another monomer to initiate block sequences. This has the disadvantage that a considerable amount of homopolymer is formed in addition to the desired block copolymer.

There are also photochemical methods of synthesizing graft copolymers. For example, Guillet and Norrish [Proc. Roy. Soc. A 233, 172 (1955)] prepared graft copolymers by photolysing polymethyl vinyl ketone or its copolymers in the presence of another monomer. However, these are not comparable in structure to linear block copolymers as illustrated and described above.

This invention has as an object to produce novel polymeric compositions possessing an unusual combination of chemical, physical and mechanical properties.

A further object is to provide a novel photochemical process for the production of such polymeric compositions.

A further object is to provide a means of obtaining linear block copolymers having any desired balance of physical and chemical properties which may be necessary or desirable for any selected use of the polymer product.

A still further object is to provide a means of balancing various physical properties of such linear block copolymers such as toughness, inertness, adhesion, modulus, tensile strength, impact strength, solubility, processability, and inherent viscosity (I.V.).

A specific object is to provide a novel process of producing such polymeric compositions by photochemical action of ultraviolet light on ethylene-carbon monoxide polymers in the presence of vinyl monomers.

Another specific object is to provide novel linear block copolymers characterized by the presence therein of blocks of ethylene-carbon monoxide attached to blocks of a vinyl monomer.

Other objects will appear hereinafter.

These objects are accomplished by the following invention which, in its broader aspects, comprises the photolysis of an ethylene-carbon monoxide polymer in the presence of a vinyl monomer. It is to be understood that the term "ethylene-carbon monoxide polymers" as used herein and in the claims includes, in addition to ethylene-carbon monoxide polymers, other ethylene-carbon monoxide polymers containing vinyl monomers which can be copolymerized with ethylene. Typical examples of such monomers are vinyl acetate, ethyl acrylate, isopropenyl acetate and related vinyl monomers. By the term photolysis is meant the chemical decomposition of a polymer by the action of ultraviolet light. Under such conditions the ethylene-carbon monoxide polymer photolysizes at the carbonyl group to form free radicals. This is illustrated by the following equation in which free radical formation is indicated:

A)

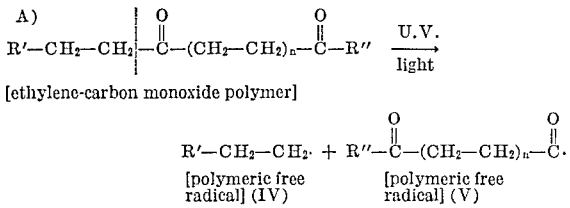

[ethylene-carbon monoxide polymer]

wherein R′ and R″ are long chain alkyl groups which may or may not contain ketone carbonyl groups. In accordance with the invention and as will be more fully set forth hereinafter and illustrated by specific examples, these polymeric free radicals initiate the polymerization of the monomer to form linear block sequences as illustrated by the following equation:

(B)

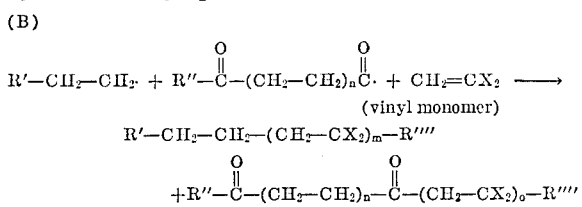

wherein R′ and R″ designate the same groups as in (A), $m$, $n$ and $o$ are integers, and R‴ and R‴′ are terminating groups such as hydrogen or alkyl groups, and $CH_2=CX_2$ is a vinyl monomer wherein X may be hydrogen, alkyl, aryl, acyl, acyloxy, cyano, halogen, diacylimido, alkoxy, aryloxy, carbaloxy, carbamyl or carboxy. Typical examples of such vinyl monomers are acrylonitrile, vinyl acetate, acrylamide, methacrylamide, methyl methacrylate, butyl methacrylate, N-substituted acrylamides, particularly N-isopropyl acrylamide, styrene, etc. It is useful but not essential that the polymer formed in this step be soluble in the reaction mixture.

The product of the invention is thus a new composition of matter consisting of a linear block copolymer in which one of the periods thereof consists of an ethylene-carbon monomer, that is, the $CH_2=CX_2$ of the above Equation B. of which consists of polymer chains formed from the vinyl monomer, that is, the $CH_2=CX_2$ of the above Equation B.

Assuming that an ethylene-carbon monoxide polymer is employed as the starting material or prepolymer, or what might be referred to as the first block, such a polymer may be prepared in accordance with well known procedures as, for example, one of the techniques described in Polyethylene by R. A. V. Raff and J. B. Allison, Interscience Publishers, Inc., New York (1956), pages 127–132. Other examples of methods of preparing these polymers are disclosed in U.S. Patent to Brubaker 2,495,286 and U.S. Patent to Loeb 3,083,184.

The ethylene-carbon monoxide polymers used in the practice of this invention may be prepared economically by the high pressure polymerization process. The inclusion of carbon monoxide in the ethylene feed readily results in the formation of and ethylene-carbon monoxide polymer containing up to 50 mole percent carbon monoxide. The polymers useful in the present invention may contain from 0.2 to 50 mole percent CO and preferably from 0.2 to 15 percent CO. With relatively low concentrations of CO, the copolymer will have physical properties almost identical with those of conventional high pressure polyethylene. As previously indicated, the term "ethylene-carbon monoxide polymers" as used herein and in the claims, included, in addition to ethylene-carbon monoxide polymers, other ethylene-carbon monoxide polymers containing vinyl monomers which can be copolymerized with ethylene. Typical examples of such monomers are vinyl acetate, methyl acrylate, isopropenyl acetate and related vinyl monomers.

The process of the invention may be carried out in a number of different ways. The ethylene-carbon monoxide polymer is first associated with the selected vinyl monomer in any convenient manner. For example, ethylene-carbon monoxide polymer, may, depending upon its chemical constitution and temperature, be in either solid or liquid form or in solution in an appropriate solvent. The added vinyl polymer may likewise be in liquid or gaseous form or in solution. In some cases the vinyl monomer will itself be a solvent for the ethylene-carbon monoxide polymer while in other cases it may be necessary or desirable to dissolve the ethylene-carbon monoxide polymer in a suitable solvent such as heptane, octane or toluene. Preferred solvents are usually saturated hydrocarbons which do not absorb the light used, but other solvents such as halogenated hydrocarbons, aromatic hydrocarbons, etc., may also be employed. It is also possible to carry out the reaction at the surface of the solid polymer when it is merely swollen slightly with the monomer used in the second step.

When a solution process is used the reaction temperature may vary over a wide range, but generally will be above about 60° C., as for example, 80°–90° C., since most ethylene polymers are not soluble below this temperature. It is usually desirable to carry out the polymerization at about 10° C. above the minimum temperature for solubility. Higher temperatures may be used but are usually avoided because of the possibility of thermal polymerization during the block step, which leads to undesirable side reactions.

In practice, the oxygen-free reactants are normally placed in a suitable glass receptacle such as a flask constructed of a borosilicate glass such as that sold under the trademark "Pyrex" or "HySil," which type of glass will absorb nearly all the light of wave lengths shorter than 3,000A. In order to prepare high yields of pure linear block copolymer products, it is essential that the light be not absorbed by the monomer itself as otherwise a certain amount of pure homopolymer will be formed as an impurity. It is important that all traces of oxygen be removed from the reaction zone as otherwise any oxygen present would act as a polymerization inhibitor and prevent blocking of the comonomer.

Assuming that the reactants are in place in the reactor described above, the material is irradiated with ultraviolet light such as that furnished by a mercury arc lamp. The mercury resonance line at 3130A is a very suitable wave length to use, since it is strongly absorbed by the ketone groups present in the prepolymer but not by most vinyl monomers. After the polymerization reaction has taken place to the desired extend the light is shut off. If the final linear block copolymer product is still in solution in the reaction mixture, it is then isolated by precipitation with a suitable nonsolvent. On the other hand, if the final product has precipitated during the U.V. exposure, it is separated from the reaction mixture, washed and dried.

The molecular weight of the ethylene-carbon monoxide prepolymer and that of the linear blocked copolymer product may be varied over a wide range by methods well known to those skilled in the art to which the invention relates to give a final product having any desired combination of physical properties and processability.

The products of the invention are useful for a wide variety of commercial applications. For example, a linear block copolymer of ethylene-CO and acrylonitrile will be soluble in hydrocarbon solvents, yet will retain many of the desirable characteristics of polyacrylonitrile itself, such as high softening point and good weather resistance. Such a polymer product can be coated into films or spun into fibers from hydrocarbon solution. This effects substantial economies, since polyacrylonitrile is usually soluble only in relatively expensive solvents such as dimethyl formamide or dimethyl acetamide.

The linear block copolymers of this invention are also useful in the manufacture of molded plastic articles, coated substrates, rubber type articles, packaging films or sheets, photographic film base, fibers, extrudable compositions and as surface active and suspending agents, lubricating oil additives and for many other purposes. A number of specific examples of uses of which a wide range of such linear block copolymers may be put are set forth in tabulated form hereinafter.

In the following examples and description there are set forth several of the preferred embodiments of the invention but these are included merely for purposes of illustration and not as a limitation thereof.

EXAMPLE I

An ethylene-carbon monoxide copolymer containing one percent by weight carbon monoxide was prepared by copolymerization at high pressures using equipment and procedures described by Erick W. Fawcett, et al., British 471,590 (September 1937). Ten grams of the copolymer was dissolved in 100 ml. distilled heptane under nitrogen, in a Pyrex flask, stirring being supplied by a magnetic stirrer. A small sample of the solution was removed and the ultraviolet absorption spectrum recorded. The solution showed an absorption band with a peak at 2900A, characteristic of the ketone carbonyl. Seven ml. of purified acrylonitrile monomer was injected into the flask with continuous stirring and the temperature maintained at 90° C. A clear, homogeneous solution was obtained. The flask was then irradiated with utlraviolet light from a BTH 250 watt mercury arc (Type ME/D). After fifteen minutes the solution became slightly milky and the light was turned off. The polymer was isolated by cooling the solution, precipitating and washing with methanol, and drying in air at 50° C. The yield was 14.8 grams of polymer. A film was compression molded and infrared analysis indicated the presence of polyethylene, ketone carbonyl and nitrile groups. This product is a linear block copolymer containing ethylene, carbon monoxide and acrylonitrile. After drying overnight the polymer became insoluble in both heptane and dimethyl formamide used individually. However, if the polymer was first swollen in hot dimethyl formamide it would then be dissolved in boiling heptane or tetralin at 120° C. The inherent viscosity of the block copolymer made in this way was 0.58 in tetralin at 90° C. A blank experiment in which acrylonitrile monomer was irradiated under the same conditions, but in the absence of ethylene-CO copolymer gave less than 0.1 g. polyacrylonitrile.

EXAMPLE II

Block copolymers of ethylene-CO with methyl methacrylate were prepared by a similar procedure to that described in Example I. Two grams of ethylene-CO copolymer containing one percent CO was dissolved in 100 ml. of solvent in a Pyrex reaction vessel equipped with a condenser. The polymer was dissolved by heating the solvent to reflux temperature while stirring the solution with a magnetic stirrer. The system was thoroughly degassed and swept with oxygen-free nitrogen. Monomer was then injected and the system irradiated with ultraviolet light from a medium pressure mercury arc. After irradiation, the solution was cooled and the polymer precipitated using methanol or acetone, washed and dried at 50° C. in a circulating air oven. The results of a series of such experiments are summarized in Table I below:

TABLE I
Block Polymers of Methyl Methacrylate on Ethylene-CO

| Solvent | Volume Methyl Methacrylate, Ml. | Irradiation Time, Min. | Yield, G. | $[\eta]$ | Percent MMA |
|---|---|---|---|---|---|
| (a) Benzene | 6.0 | 114 | 2.8 | 0.752 | 30 |
| (b) Benzene | 10.0 | 113 | 2.7 | 0.732 | 26 |
| (c) Benzene | 20.0 | 100 | 3.8 | -------- | 47 |
| (d) Benzene | 15.0 | 114 | 3.46 | 0.640 | 42 |
| (e) Benzene | 20.0 | 110 | 5.01 | 0.63 | 60 |

EXAMPLE III

Ten grams of an ethylene vinyl acetate-CO (80/18/2) terpolymer was dissolved in heptane and irradiated in the presence of acrylonitrile monomer as described in Example I. After fifteen minutes irradiation, the yield of polymer was 18.7 grams. The polymer had an inherent viscosity of 1.2 in tetralin at 90° C. and contained 49 percent acrylonitrile by infrared analysis. This product is a linear block copolymer containing ethylene, vinyl acetate, carbon monoxide, and acrylonitrile.

EXAMPLE IV

A 10 mil. film of ethylene-CO copolymer containing 5 percent CO by weight was swollen in hot butyl methacrylate monomer and irradiated in a Pyrex reaction flask under nitrogen for 10 minutes. The film was then extracted with boiling acetone to remove monomer and any poly(butyl methacrylate) homopolymer. After drying the film showed a weight increase of 19 percent, and infrared analysis indicated the presence of approximately 21 percent poly(butyl methacrylate) in the block copolymer. The final product thus contained ethylene, carbon monoxide and butyl methacrylate in linear blocks.

EXAMPLE V

The procedure of Example IV was repeated using a film of ethylene-CO copolymer (one percent CO) and acrylonitrile monomer. After one hour the light was turned off and the film dried. The weight of the film had increased by 10 percent and infrared analysis indicated the presence of polyacrylonitrile blocks. This product was a linear blocked copolymer containing ethylene, carbon monoxide, and acrylonitrile.

EXAMPLE VI

Example I was repeated except styrene was employed as the vinyl monomer in place of acrylonitrile. The yield was 13.2 g. The linear block copolymer products infrared spectrum indicated the presence of polyethylene, ketone carbonyl, and aromatic benzene rings. The inherent viscosity of this linear block copolymer was 0.70.

EXAMPLE VII

Example I was repeated except vinyl acetate was employed as the vinyl monomer rather than acrylonitrile. The yield was 16.1 g. The inherent viscosity of this linear block copolymer was 0.76. The product was a linear block copolymer of ethylene, carbon monoxide, and vinyl acetate.

Ultraviolet sensitizers can be efficiency employed to speed up the polymerization process in the production of the linear block copolymers of the invention. Typical examples of such sensitizers are benzophenone and hexachlorobenzene. The use of such sensitizers are discussed in an article by A. Charlesby et al. in Proc. Roy. Soc. London A 268, 205 (1962).

EXAMPLE VIII

The procedure of Example V was repeated except that 0.002 percent benzophenone was added to the reaction mixture. This resulted in reducing the time required from one hour to 10 minutes to give a total weight of 2.2 g. of ethylene linear block copolymer product representing an increase of 10 weight percent.

EXAMPLE IX

The procedure of Example 2e was repeated using methyl acrylate in place of methyl methacrylate as the added vinyl monomer. The yield of linear block copolymer product was 7.2 g. and the I.V. was 0.41. The percentage of methyl acrylate in the final product was 62 percent.

Typical of the uses to which typical linear block copolymer products of varying chemical composition produced in accordance with the invention may be put are the following:

TABLE II

| Ex. | Polymer | Useful As— |
|---|---|---|
| 1 | $C_2H_4$—CO—AN | Fiber. |
| 2a | $C_2H_4$—CO—30 percent MMA | Thermoplastic film. |
| 2b | $C_2H_4$—CO—26 percent MMA | Do. |
| 2c | $C_2H_4$—CO—47 percent MMA | Extrusion coating for paper. |
| 2d | $C_2H_4$—CO—42 percent MMA | Do. |
| 2e | $C_2H_4$—CO—60 percent MMA | Do. |
| 3 | $C_2H_4$—VA—CO—AN | Packaging film and fibre. |
| 4 | $C_2H_4$—CO—Buma | Packaging film. |
| 5 | $C_2H_4$—CO—AN | Do. |
| 6 | $C_2H_4$—CO—VA | Injection molding plastic. |
| 7 | $C_2H_4$—CO—VA | Improved rubber. |
| 8 | $C_2H_4$—CO—AN | Packaging film. |
| 9 | $C_2H_4$—CO—62 percent MA | Lubricating oil additive. |

In the above table the following abbreviations identify the composition of the added vinyl monomer employed in the preparation of the linear block copolymer product.

AN—Acrylonitrile
MMA—Methyl methacrylate
BUMA—Butyl methacrylate
VA—Vinyl acetate
MA—Methyl acrylate It will thus be seen that an outstanding advance in the art of producing linear block copolymers has been provided by the instant invention. As indicated above, an outstanding advantage in the production of such polymers by the process herein described is that one is enabled to obtain any desired balance of physical properties and chemical constitution as may be required for any specific use or application. An almost infinite variety of variations in such physical properties and chemical constitution is possible. To take a specific example, one is enabled by the present invention to obtain in any given linear block copolymer any desired degree of inertness to polar solvents and at the same time obtain good adhesion to polar substrates. Another example is ability to obtain both good toughness and high modulus in the same polymer product. Likewise, a polymer product having both good impact strength and excellent processability may be obtained in the process by providing appropriate blocks or chemical structures which will contribute these properties. In addition, one may obtain linear block copolymer fibers having excellent dyeability comparable to that of acrylonitrile polymers and at the same time having the physical properties of a polyolefin type fiber.

Although the invention has been described in considerable detail with particular reference to certain preferred embodiments thereof, variations and modifications can be effected within the spirit and scope of the invention as described hereinabove, and as defined in the appended claims.

I claim:

1. The process of producing linear block copolymers which comprises photolysing a mixture of an ethylene-carbon monoxide polymer with a vinyl monomer by subjecting said mixture to the action of ultraviolet light.

2. The process of producing linear block copolymers which comprises photolysing a mixture of an ethylene-carbon monoxide polymer containing from 0.2 to 50 mole percent carbon monoxide with a vinyl monomer by subjecting said mixture to the action of ultraviolet light.

3. The process of producing linear block copolymers which comprises photolysing a mixture of an ethylene-carbon monoxide polymer containing from 0.2 to 50 mole percent carbon monoxide with a vinyl monomer having the structure $CH_2=CX_2$ wherein X is a substituent selected from the group consisting of hydrogen, alkyl, aryl, acyl, acyloxy, cyano, halogen, diacylimido, alkoxy, aryloxy, carbalkoxy, carbamyl and carboxy by subjecting said mixture to the action of ultraviolet light.

4. The process of producing linear block copolymers which comprises photolysing a mixture of an ethylene-carbon monoxide polymer containing from 0.2 to 50 mole percent of carbon monoxide with acrylonitrile by subjecting said mixture to the action of ultraviolet light.

5. The process of producing linear block copolymers which comprises photolysing a mixture of an ethylene-carbon monoxide polymer containing from 0.2 to 50 mole percent of carbon monoxide with vinyl acetate by subjecting said mixture to the action of ultraviolet light.

6. The process of producing linear block copolymers which comprises photolysing a mixture of an ethylene-carbon monoxide polymer containing from 0.2 to 50 mole percent of carbon monoxide with methyl methacrylate by subjecting said mixture to the action of ultraviolet light.

7. The process of producing linear block copolymers which comprises photolysing a mixture of an ethylene-carbon monoxide polymer containing from 0.2 to 50 mole percent of carbon monoxide with N-isopropyl acrylamide by subjecting said mixture to the action of ultraviolet light.

8. The process of producing linear block copolymers which comprises photolysing a mixture of an ethylene-carbon monoxide polymer containing from 0.2 to 50 mole percent of carbon monoxide with styrene by subjecting said mixture to the action of ultraviolet light.

9. The process of producing linear block copolymers which comprises subjecting a mixture of an ethylene-carbon monoxide with a vinyl monomer to the action of ultraviolet light and in the presence of an ultraviolet sensitizer.

10. A linear block copolymer containing at least two periods one of which consists of an ethylene-carbon monoxide polymer chain and the other period or periods consists of polymer chains from a vinyl monomer.

11. A linear block copolymer containing at least two periods one of which consists of an ethylene-carbon monoxide polymer chain containing from 0.2 to 50 mole percent of carbon monoxide and the other period or periods consists of polymer chains derived from acrylonitrile.

12. A linear block copolymer containing at least two periods one of which consists of an ethylene-carbon monoxide polymer chain containing from 0.2 to 50 mole percent of carbon monoxide and the other period or periods consists of polymer chains derived from vinyl acetate.

13. A linear block copolymer containing at least two periods one of which consists of an ethylene-carbon monoxide polymer chain containing from 0.2 to 50 mole percent of carbon monoxide and the other period or periods consists of polymer chains derived from methyl methacrylate.

14. A linear block copolymer containing at least two periods one of which consists of an ethylene-carbon monoxide polymer chain containing from 0.2 to 50 mole percent of carbon monoxide and the other period or periods consists of polymer chains derived from N-isopropyl acrylamide.

15. A linear block copolymer containing at least two periods one of which consists of an ethylene-carbon monoxide polymer chain containing from 0.2 to 50 mole percent of carbon monoxide and the other period or periods consists of polymer chains derived from styrene.

References Cited

UNITED STATES PATENTS 3,083,184 3/1963 Loeb _____ 260—63
3,069,381 12/1963 Nozaki _____ 260—878

MURRAY TILLMAN, Primary Examiner
JOHN T. GOOLKASIAN, Assistant Examiner

U.S. Cl. X.R.

204—159.15, 159.17